United States Patent

Suzuki et al.

[11] Patent Number: 5,850,478
[45] Date of Patent: Dec. 15, 1998

[54] IMAGE FORMING APPARATUS

[75] Inventors: Katsunari Suzuki, Kawasaki; Shizuo Hasegawa, Tokyo; Masao Watanabe, Kawasaki; Masatoshi Yaginuma, Tokyo, all of Japan

[73] Assignee: Canon Kabushiki Kaisha, Tokyo, Japan

[21] Appl. No.: 720,467

[22] Filed: Sep. 30, 1996

Related U.S. Application Data

[63] Continuation of Ser. No. 380,799, Jan. 30, 1995, abandoned.

[30] Foreign Application Priority Data

Jan. 31, 1994 [JP] Japan .................................. 6-009768

[51] Int. Cl.⁶ ............................................................ G06K 9/46
[52] U.S. Cl. .................................................. 382/204; 412/11
[58] Field of Search ........................................ 382/138, 204, 382/149, 291, 317, 313; 355/241, 75, 76; 358/500, 515, 448; 347/119, 129; 412/11

[56] References Cited

U.S. PATENT DOCUMENTS

| | | | |
|---|---|---|---|
| 4,571,058 | 2/1986 | Lehman | 355/241 |
| 4,685,141 | 8/1987 | Hoque et al. | 382/138 |
| 4,797,939 | 1/1989 | Hoki et al. | 382/149 |
| 5,115,259 | 5/1992 | Itoh | 347/119 |
| 5,150,422 | 9/1992 | Kitakado et al. | 382/149 |
| 5,318,173 | 6/1994 | Datari | 382/204 |
| 5,383,754 | 1/1995 | Sumida et al. | 412/11 |

Primary Examiner—Jose L. Couso
Assistant Examiner—Anh Hong Do
Attorney, Agent, or Firm—Fitzpatrick, Cella, Harper & Scinto

[57] ABSTRACT

An image forming apparatus includes a reading unit for reading an image on a document, a storage unit for storing image data output from the reading unit, an image forming unit for forming an image on a recording medium on the basis of the image data stored in the storage unit, a discrimination unit for discriminating whether or not a hole is present in the document read by the reading unit by analyzing the image data stored in the storage unit, and a control unit for, when the discrimination unit determines that the hole is present, controlling the image forming unit to form an image while masking an image in an area where the hole is present.

13 Claims, 9 Drawing Sheets

FIG. 2
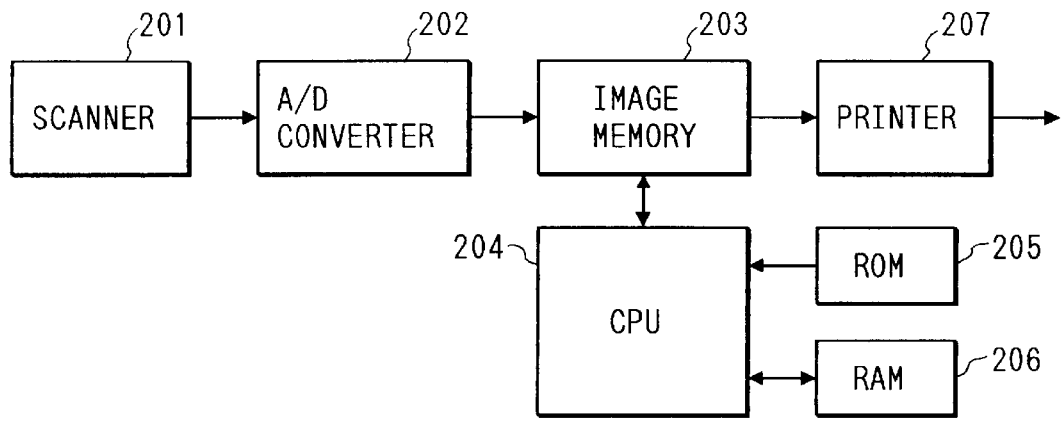
FIG. 3A
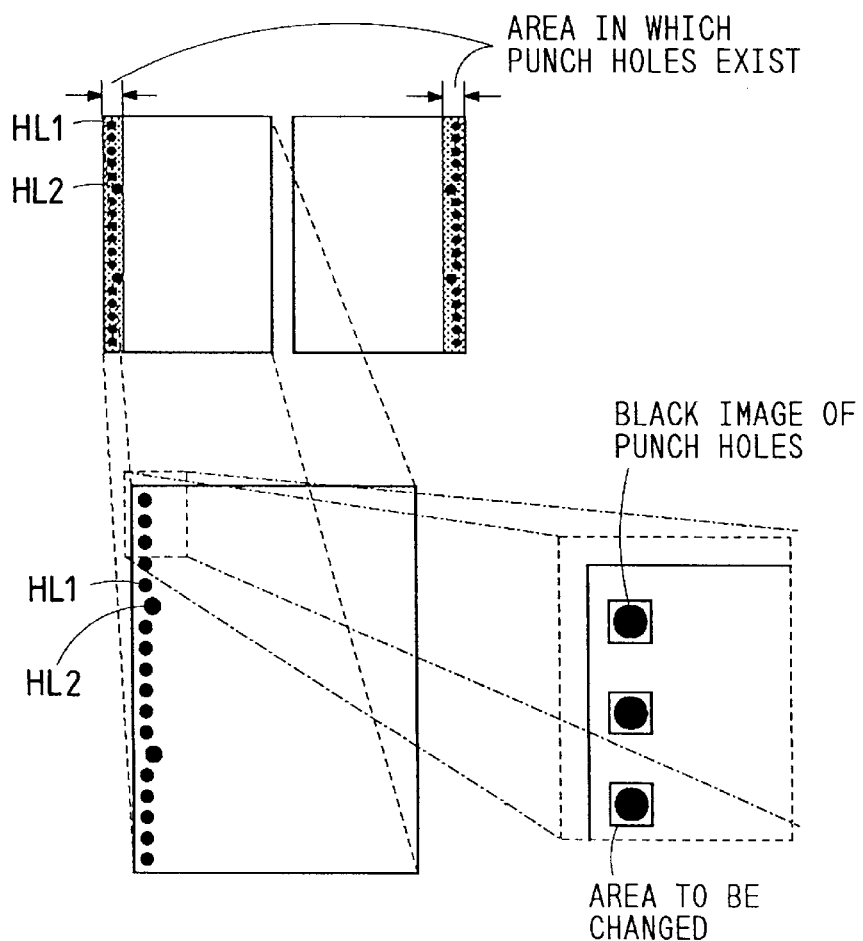
FIG. 3B    FIG. 3C

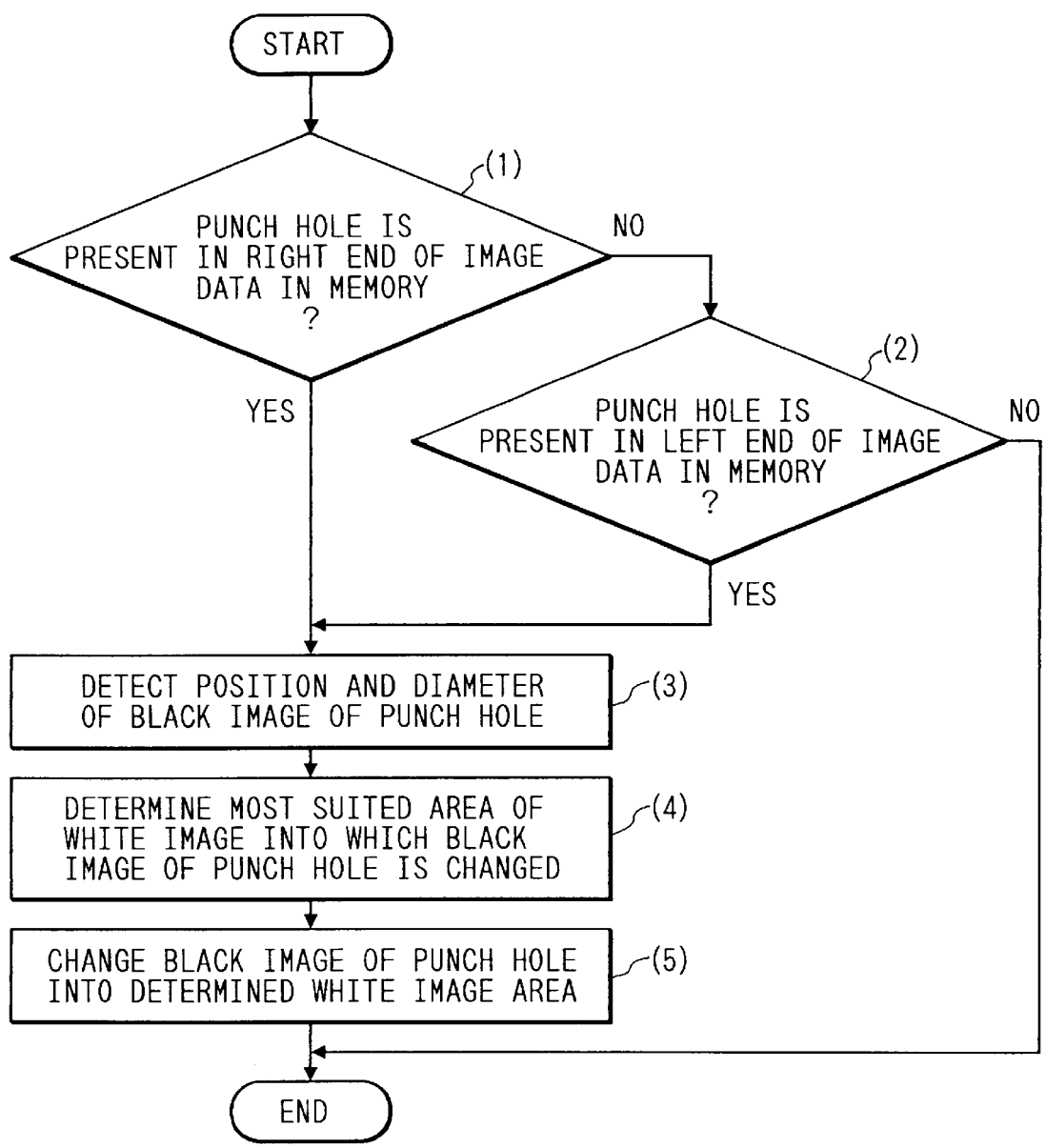

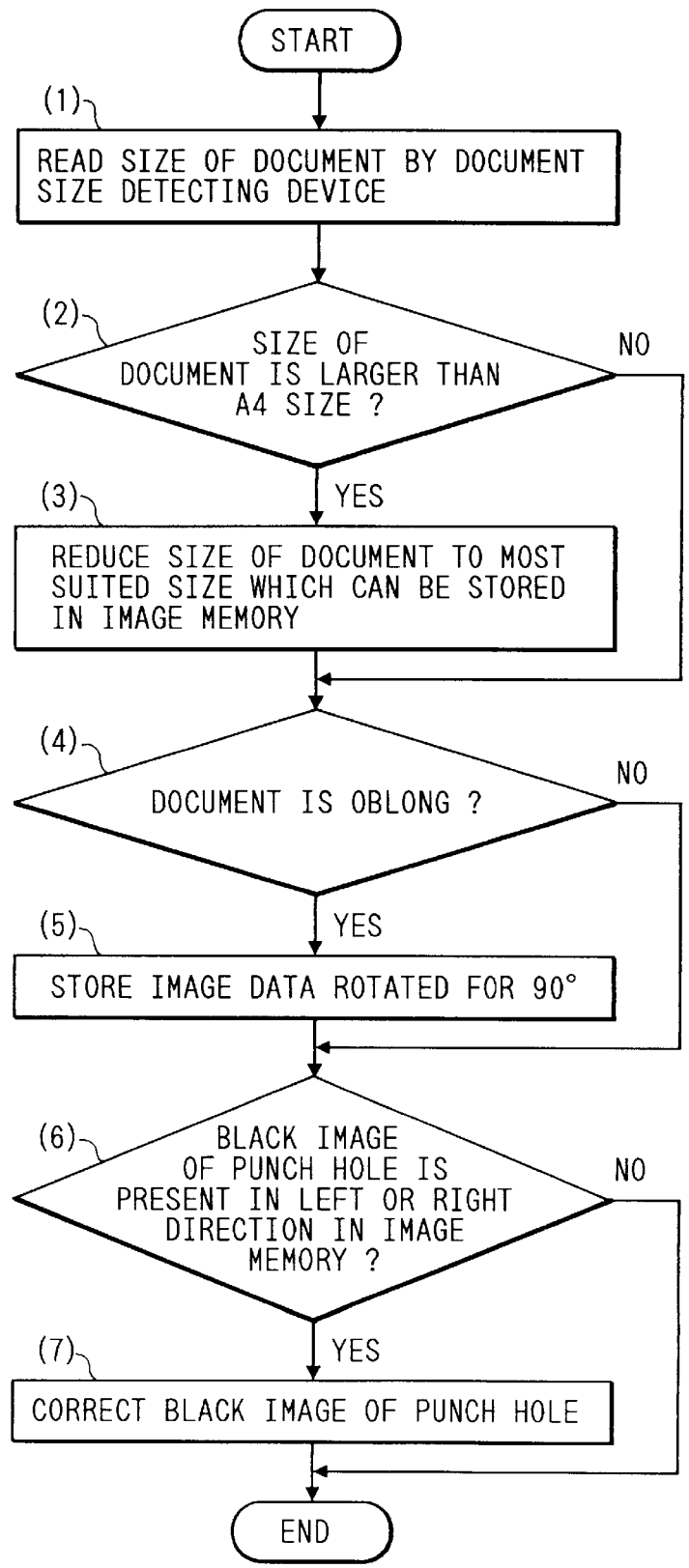

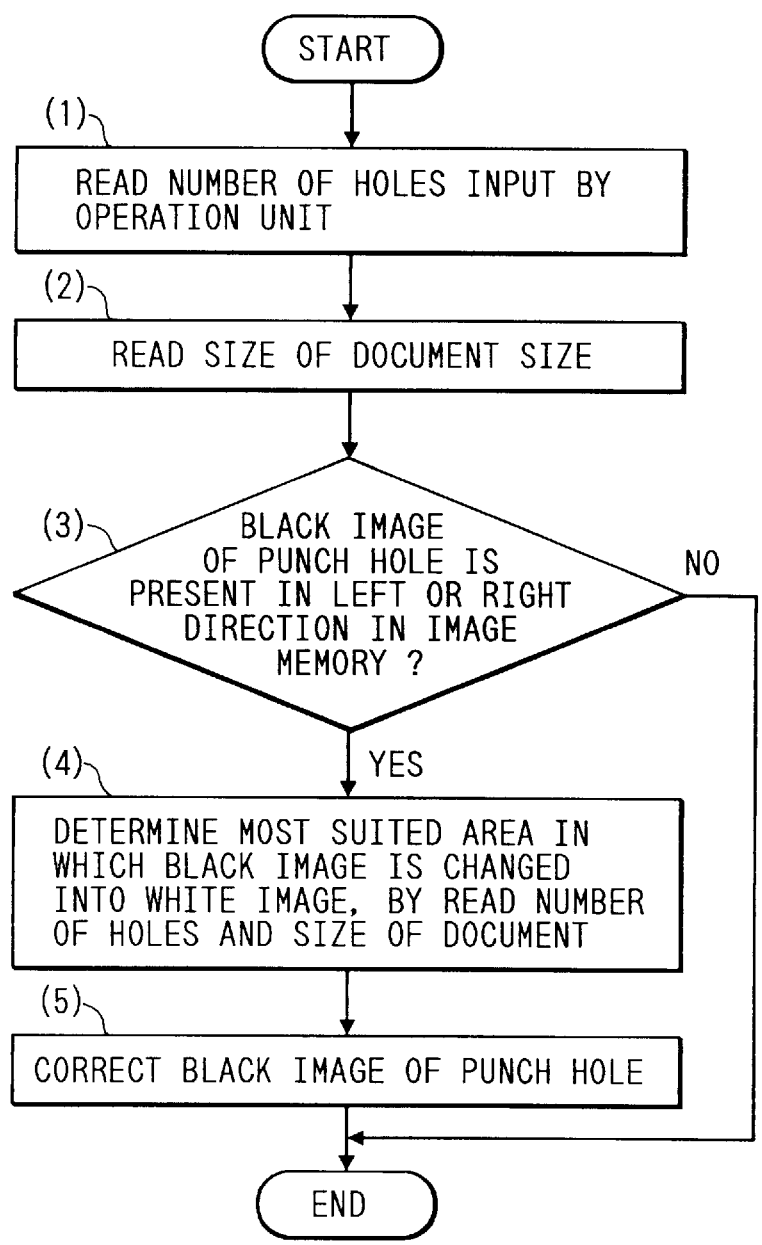

IMAGE FORMING APPARATUS

This application is a continuation of application Ser. No. 08/380,799 filed Jan. 30, 1995, now abandoned.

BACKGROUND OF THE INVENTION

1. Field of the Invention

The present invention relates to an image forming apparatus for forming an image on the basis of image data obtained by reading a document image and, more particularly, to an image forming apparatus which can detect an array of small holes such as punch holes in a document to be read.

2. Related Background Art

Conventionally, when a document with an array of holes such as punch holes is copied, the holes appear as black images on a copied image. In order to erase such black images, an operator must designate an area including punch holes, and mask the image of the designated region.

However, when the entire area including the punch holes is masked in a strip shape, characters written between adjacent punch holes are also erased together.

Such punch holes are required upon filing a document. However, when a document with punch holes is to be copied, black images are undesirably formed at the right or left end portions of a recording medium although they are not present on the document, thus deteriorating image quality.

SUMMARY OF THE INVENTION

It is an object of the present invention to provide an image forming apparatus which can solve the above-mentioned problems.

It is another object of the present invention to provide an image forming apparatus which can prevent unnecessary images from being formed due to holes formed in a document without erasing characters and the like on the document.

It is still another object of the present invention to provide an image forming apparatus which can automatically discriminate whether or not holes are formed in a document.

It is still another object of the present invention to provide an image forming apparatus which can automatically convert black images formed due to holes in a document into white images.

It is still another object of the present invention to provide an image forming apparatus which can reduce the load on an operator and can provide good operability.

Other objects of the present invention will become apparent from the following description taken in conjunction with the accompanying drawings and the appended claims.

BRIEF DESCRIPTION OF THE DRAWINGS

FIG. 2 is a block diagram for explaining the data processing arrangement of the image forming apparatus shown in FIG. 1;

FIGS. 3A to 3C are views for explaining a document with punch holes.

FIG. 4 is a flow chart showing an example of the first image processing sequence for punch holes in the image forming apparatus according to the present invention;

FIG. 8 is a flow chart showing an example of the second image processing sequence for punch holes in the image forming apparatus according to the present invention;

FIG. 10 is a flow chart showing an example of the third image processing sequence for punch holes in the image forming apparatus according to the present invention.

DETAILED DESCRIPTION OF THE PREFERRED EMBODIMENTS

[First Embodiment]

Figure 1:
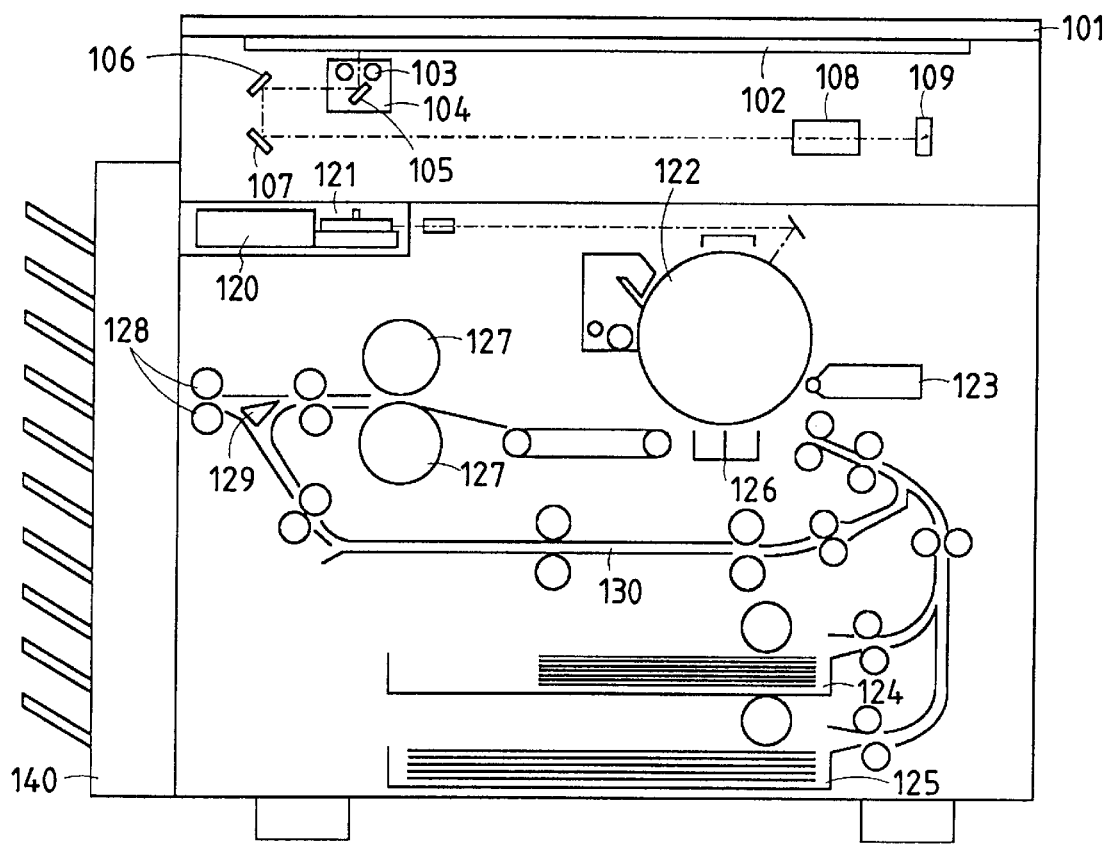
FIG. 1 is a schematic sectional view for explaining the arrangement of an image forming apparatus according to an embodiment of the present invention.

FIG. 1 is a schematic sectional view for explaining the arrangement of an image forming apparatus according to an embodiment of the present invention.

Referring to FIG. 1, a document pressing plate 101 has a document pressing surface which is subjected to mirror surface processing, and directly reflects exposed light on an area where a document is not placed (does not irregularly reflect the light). With this arrangement, the reflected light is recognized as a black image without being focused on a CCD sensor 109. Therefore, when a document with punch holes is pressed by the document pressing plate and is exposed with light, the punch holes are recognized as black images. A document table glass 102 is used for exposing a document, detecting a document size by a document size detecting device (not shown), and so on. A light source 103 illuminates a document with light. A scanner 104 scans and moves along a document surface to read a document image. First to third reflection mirrors 105 to 107 form an optical path for guiding light reflected by a document to the CCD sensor 109. A lens 108 for converging light is arranged in the middle of the optical path. The CCD sensor 109 is arranged at the focal point position of the lens 108, and converts the reflected light from a document into image data.

Image data obtained by the CCD sensor 109 causes a laser to emit a laser beam via a laser driver 120. The laser beam is scanned by a polygonal mirror 121 onto a photosensitive drum 122. Upon scanning of the laser beam, a latent image is formed on the photosensitive drum 122, and is developed by a developer 123, thus forming a visible image on the photosensitive drum 122.

A copy paper sheet is fed from a first or second paper cassettes 124 or 125, and an image is transferred onto the copy paper sheet by a transfer peeling charger 126. The paper sheet is conveyed to the left in FIG. 1, and the image transferred onto the sheet is fixed by fixing rollers 127. Thereafter, the paper sheet is exhausted by exhaust rollers 128. When the convey direction is switched by a flapper 129 serving as a switch back portion to reverse the exhaust rollers 128, the copy paper sheet is conveyed to an intermediate tray 130 to allow a double-sided copying operation. On the other hand, when the convey direction is switched by the flapper 129 in a direction toward the intermediate tray 130 before the copy paper sheet reaches the exhaust rollers 128, a multiple copying operation is realized. A sorter 140 can sort copy paper sheets.

The detection processing of punch hole positions on a document will be described below with reference to FIG. 2.

FIG. 2 is a block diagram for explaining the data processing arrangement of the image forming apparatus shown in FIG. 1.

Referring to FIG. 2, a scanner (reader unit) 201 reads an image and outputs an image signal. An image signal obtained by the scanner 201 is converted by an A/D converter 202 into binary and multi-value (e.g., 256-gradation level) image data. The image data is temporarily stored in an image memory 203, and processing operations for detecting punch holes in the image data stored in the image memory 203 and changing areas corresponding to punch holes into white images are performed by a CPU 204 based on a program and data stored in a ROM 205 and a RAM 206 connected to the CPU 204.

The image data subjected to punch hole area correction is output as an image onto a recording medium by a printer engine for performing an electrophotography process in a printer 207.

The detection method of punch holes and control for changing punch hole areas into white images will be described below with reference to FIGS. 3A to 3C and FIG. 4.

FIGS. 3A to 3C are views for explaining a document with punch holes to be read by the scanner 201 shown in FIG. 2.

Image data stored in the image memory 203 includes black images formed based on punch holes HL1 and HL2. These black images are located at the right or left end portions of image data for one page (see FIG. 3A).

The image processing operation for punch holes in the image forming apparatus according to the present invention will be described below with reference to the flow chart shown in FIG. 4.

FIG. 4 is a flow chart showing an example of an image processing sequence for punch holes in the image forming apparatus according to the present invention. Note that (1) to (5) indicate steps, and the sequence is stored in the ROM 205.

Since black images formed by punch holes are present in an area with a given width (see FIG. 3A) at either the right or left end portion of image data stored in the image memory 203, when a punch hole detection/correction mode is started, it is checked if black images are present in the area. For example, in the case of 26 punch holes, all the punch holes are included in an area within 1 cm from the edge of the image. For this reason, areas within a width of about 1 cm at the right and left end portions of the image stored in the image memory need only be checked.

It is then checked in step (1) if black images formed by punch holes are present at the right end portion of image data in the memory. If N (NO) in step (1), it is checked in step (2) if black images formed by punch holes are present at the left end portion of image data. If N is also determined in step (2), it is determined that no black images formed by punch holes are present on a document, and the punch hole detection/correction mode processing ends.

On the other hand, if it is determined in step (1) or (2) that black images formed by punch holes are present on image data, the positions and hole diameters of black images formed by the punch holes on a document are detected with reference to the addresses of the black images on the image data stored in the image memory 203 in step (3).

In step (4), areas to be corrected are determined on the basis of the detected information of the positions and diameters of punch holes. In step (5), data processing for changing the black images in the image memory into white images is performed, thus ending processing.

More specifically, in step (5), the addresses of optimal white images into which the black images are to be changed are determined, and the black images are changed into the determined white images to cover the black image areas formed by punch holes (FIG. 3C). In this manner, an image without punch holes can be formed on the read image on the image memory 203.

After circular black images formed by punch holes on an image are corrected to white images, the corrected image is output onto a copy paper sheet by an electrostatic photography process in the printer 207.

As a method of actually detecting the positions and diameters of punch holes, a method of detecting whether or not circular black images formed by punch holes are present at the right or left end portion of an image on image data stored in the image memory 203 will be described in detail below.

Figure 5:
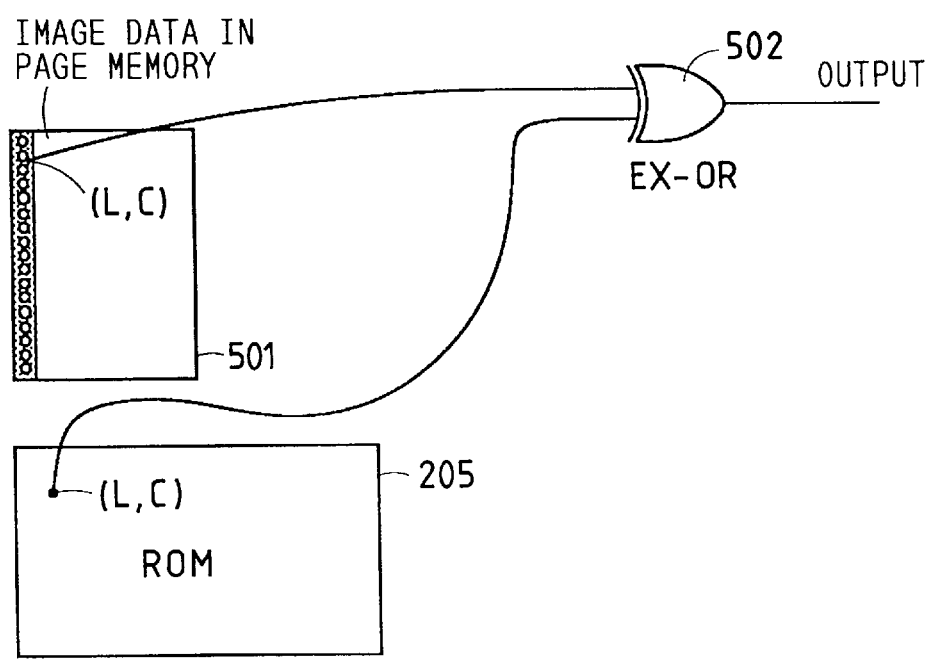
FIG. 5 is a schematic diagram for explaining detection processing of black images formed due to punch holes in the image forming apparatus according to the present invention.

FIG. 5 is a schematic diagram for explaining detection processing of circular black images formed by punch holes in the image forming apparatus according to the present invention.

As a method of detecting whether or not circular black images formed by punch holes HL1 and HL2 are present, the positions of circular black images in units of hole types (two holes, three holes, four holes, 20 holes, 26 holes, 30 holes, and the like) are stored in advance as address information in the ROM 205, as shown in FIG. 5.

Then, the addresses of the punch hole positions stored in the ROM 205 are compared with all the addresses or the address of only a sample point (in FIG. 5, an address (L. C)) of image portions at the right and left end portions of an image 501 stored in the image memory 203 by an EX-OR (exclusive OR) 502, as shown in FIG. 5.

With this arrangement, if "Low" is output, it is determined that the pixel at that address is a black image; if "High" is output, it is determined that the pixel at that address is not a black image. Using the above-mentioned means, the positions, and the like of punch holes on a document can be detected.

Note that image data may be changed into white image data when it is output to the printer 207, in place of changing the data in the image memory 203 into white image data.

[Second Embodiment]

In the first embodiment, the positions of punch holes on a document are detected by executing calculation processing between image information at a predetermined address and image data of a pixel corresponding to the predetermined address in stored image information. As will be described later, the image memory 203 may comprise a line memory for sequentially storing an image for one line read by the scanner 201. For example, when 1-cm wide areas at the right and left end portions are to be discriminated like in the first embodiment, the discrimination can be realized by comparing 158 lines when the reading resolution is 400 dpi, or 237 lines when the reading resolution is 600 dpi.

Figure 6:
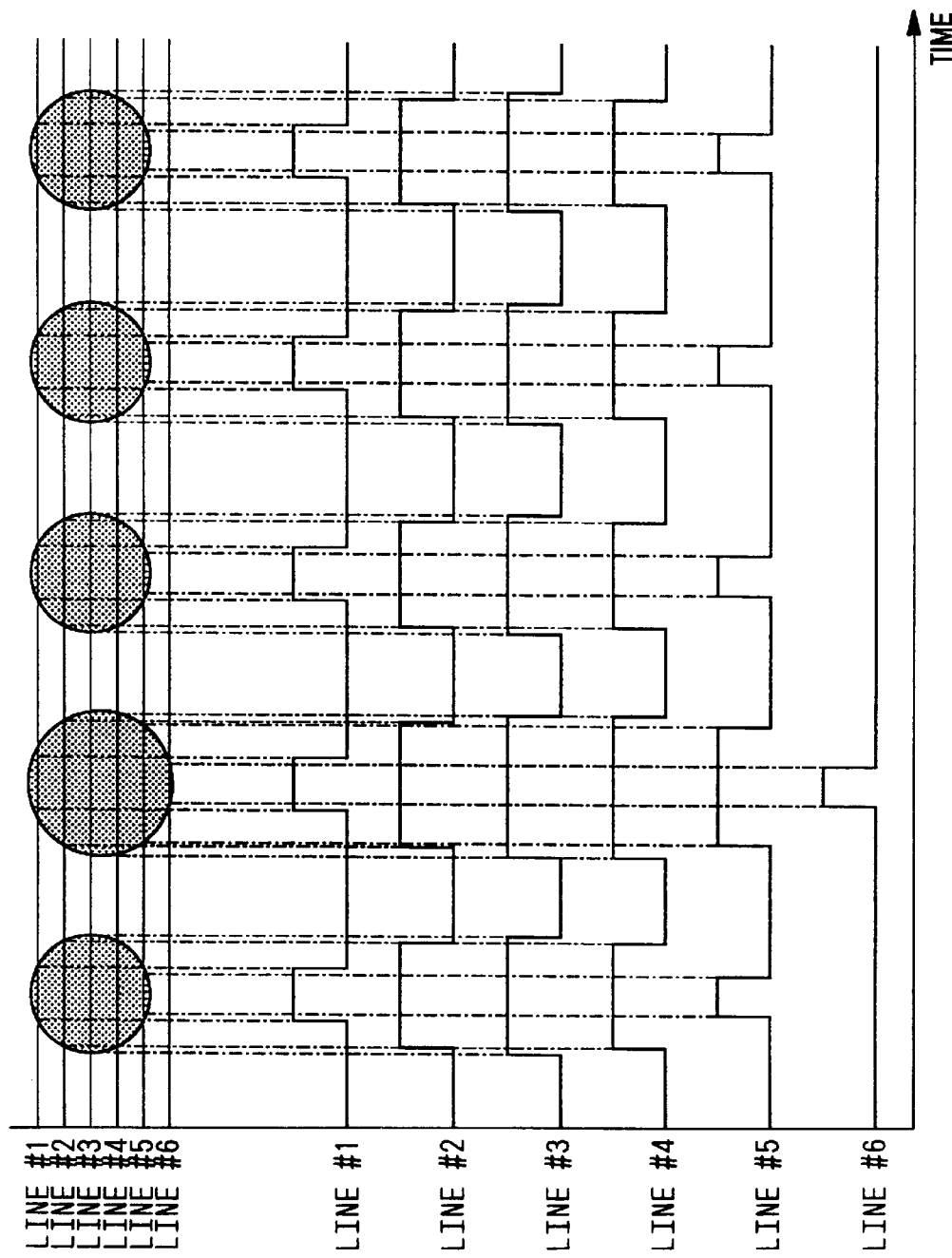
FIG. 6 is a view for explaining another punch hole detection method in the image forming apparatus according to the present invention.

FIG. 6 is a view for explaining another punch hole detection method in the image forming apparatus according to the present invention. For the sake of simplicity, an image input state read at a low resolution will be explained below.

As shown in FIG. 6, black images formed by punch holes in a document are detected within a range from line #1 to line #6. When circular black images are present on a document, the read images are expressed by "High" and "Low" rectangular waveform outputs in units of lines, as shown in FIG. 6 (in this embodiment, "High"=black; "Low"=white).

Since the distance between adjacent scanning lines upon reading is predetermined, the positions and diameters of punch holes can be detected based on the rectangular waveform outputs.

By changing image data corresponding to "High" portions detected in units of lines into "Low" image data, and outputting the changed data to the printer 207, black images formed by punch holes can be erased (changed into white images).

[Third Embodiment]

In the first embodiment, when an image forming apparatus has an image memory having a capacity corresponding to one A4-size page as the image memory 203 for storing image data in units of pages, and this apparatuses processes a document having a size larger than the A4 size, an image must be temporarily reduced when it is stored in the image memory 203. When the image forming apparatus with this arrangement corrects black images formed by punch holes on a document in consideration of the document size, the arrangement shown in FIG. 7 is required.

Figure 7:
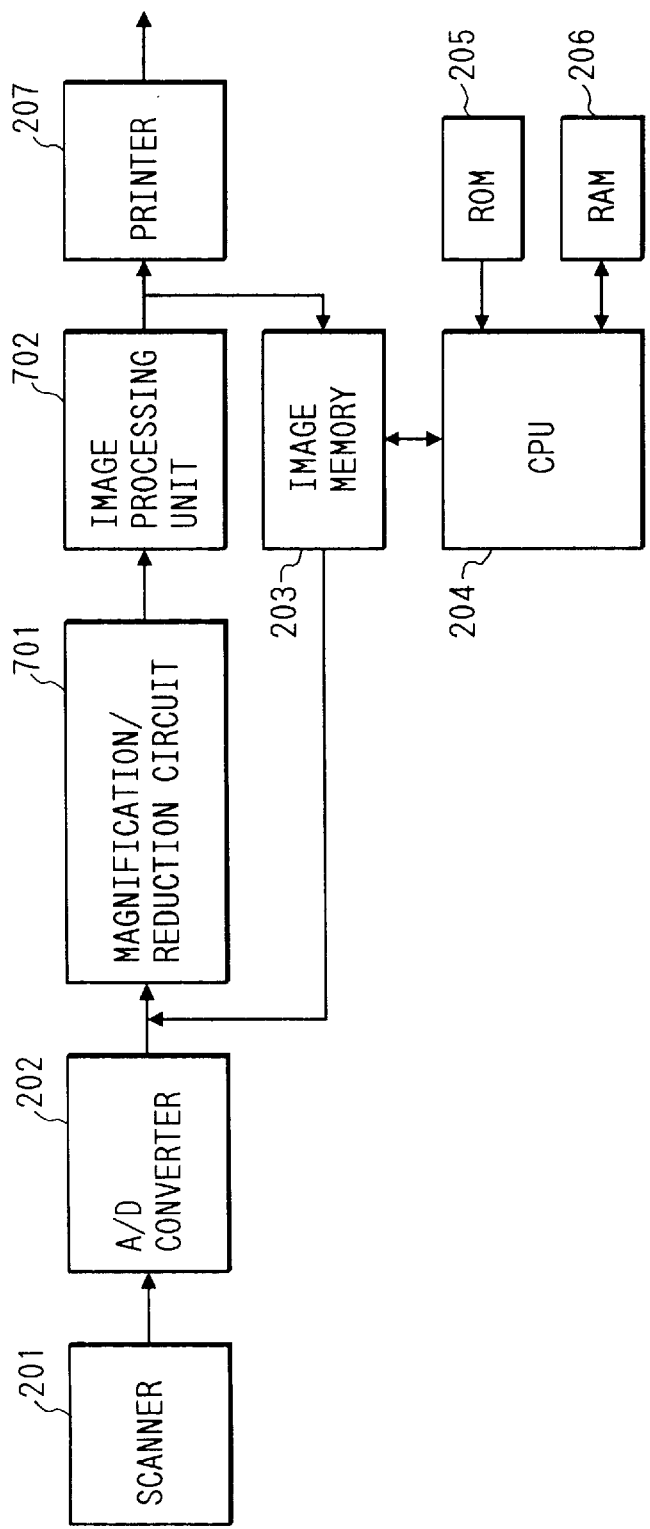
FIG. 7 is a block diagram for explaining the control arrangement of an image forming apparatus according to another embodiment of the present invention.

FIG. 7 is a block diagram for explaining the control arrangement of an image forming apparatus according to another embodiment of the present invention, and the same reference numerals in FIG. 7 denote the same parts as in FIG. 2.

Image data obtained by the A/D converter 202 is subjected to magnification/reduction processing in a magnification/reduction circuit 701, and the processed data from image processing unit 702 is stored in the image memory 203. Note that the image forming apparatus shown in FIG. 1 comprises a document size detecting device (not shown). When a document size is detected by the document size detecting device, and it is detected that the document size is larger than the A4 size, image data is reduced to an optimal size to be able to be stored in the page memory (image memory 203), and is stored in the memory. Thereafter, the stored image data is subjected to the above-mentioned processing for converting images formed by punch holes into white images. When the processed image is to be output to the printer, the processed image is magnified at a magnification corresponding to the reciprocal of the reduction factor by the magnification/reduction circuit 701, and the magnified data as processed by the image processing unit 702 is output by the printer 207.

FIG. 8 is a flow chart showing an example of the second punch hole image processing sequence in the image forming apparatus according to the present invention. Note that (1) to (7) indicate steps, and the sequence is stored in the ROM 205.

When the second punch hole correction mode is started, the document size detected by the document size detecting device in the main body is read in step (1). It is checked in step (2) if the read document size is larger than the A4 size. If Y (YES) in step (2), image data is reduced to a size which can be stored in the image memory 203 (in this embodiment, the A4 size (depending on the capacity of the image memory 203)) in step (3).

Therefore, for example, if the size of a document is the A3 size, 70% reduction is performed. It is then checked in step (4) based on the document size detecting device if the document is oblong. If Y in step (4), the image data is rotated through 90°, and the rotated image is stored in the image memory 203 in step (5). Since the image is rotated, black images formed by punch holes must be prevented in only the right or left direction with respect to the memory. Therefore, in step (6), it is checked if black images are present in the right or left direction with respect to the image memory 203. In this case, when the black images are detected by the same method as in the first embodiment, the addresses of punch holes stored in the ROM 205 are multiplied with a reduction factor, and thereafter, a comparison is made.

If Y in step (6), the black images formed by the punch holes are corrected by the method described in the second embodiment in step (7), thus ending the second punch hole correction mode.

Note that the capacity of the page memory (image memory 203) corresponds to the A4 size in this embodiment. However, this capacity is not limited to the A4 size, and the present invention is similarly applicable to systems having page memories with other capacities.

When a magnification/reduction copying operation is performed, black images formed by punch holes can be detected by the same method as described above.

[Fourth Embodiment]

In each of the above embodiments, the number and positions of holes are fixed independent of the document size. However, some punch hole standards have different hole positions depending on the document sizes, as shown in FIGS. 9A and 9B, even when the number of holes remains the same.

Figure 9A:
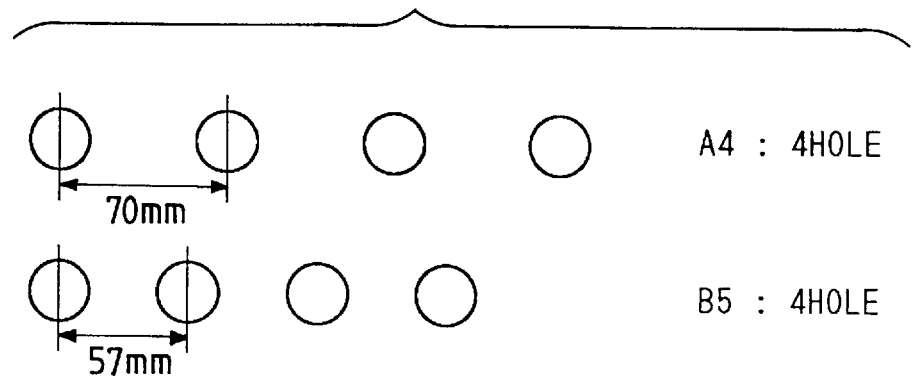
FIGS. 9A and 9B are views for explaining punch hole positions of documents with punch holes in units of document sizes.
Figure 9B:
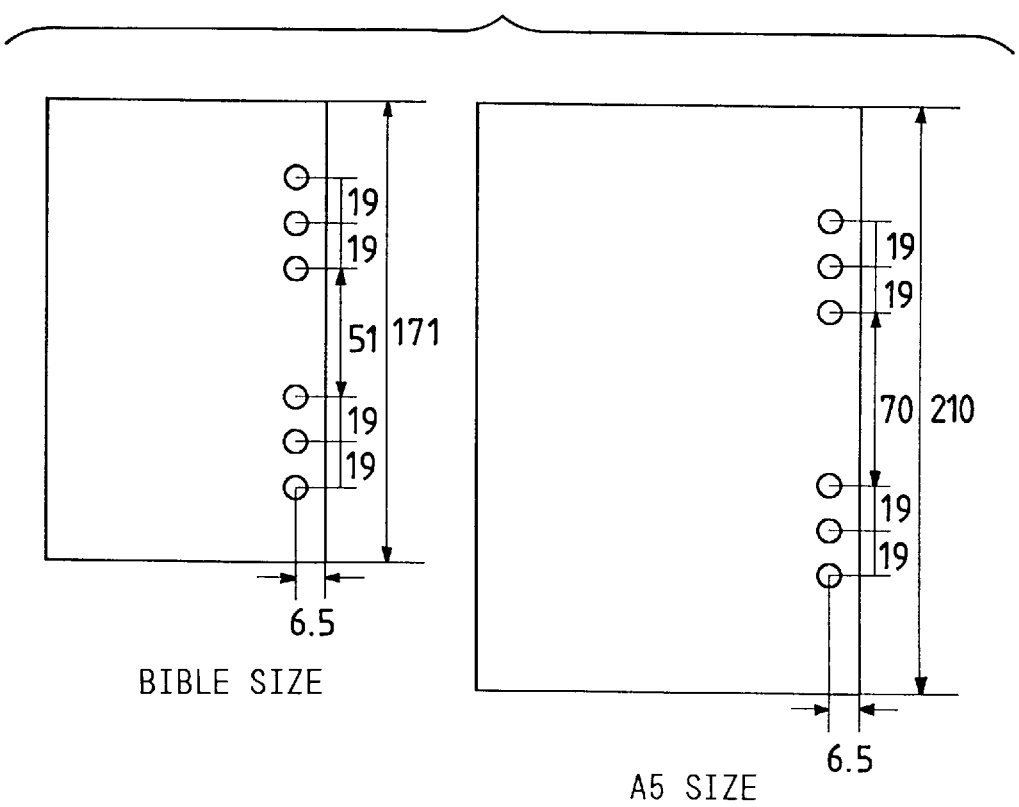

FIGS. 9A and 9B are views for explaining the punch hole positions of documents with punch holes in units of document sizes.

As shown in FIGS. 9A and 9B, the punch hole intervals of documents of the A4 and B5 sizes are different from each other even in the four-hole standard (see FIG. 9A). In the case of a six-hole standard used for system notebooks, the hole positions of documents of the bible size (utilized for the system notebooks) and the A5 size are different from each other even when the punch hole interval remains the same (see FIG. 9B).

In this embodiment, it is assumed that black images formed by punch holes are present at these predetermined positions, and their positions are stored in the storage means (ROM) 205, and the like. It is then checked in correspondence with the stored positions if read image data includes black images, thereby detecting black images.

As described above, punch hole formation methods have standards, and when a user designates a standard using an operation unit, black images formed by punch holes are corrected in accordance with a sequence shown in the flow chart to be described below.

FIG. 10 is a flow chart showing an example of the image processing sequence for punch holes in the image forming apparatus according to the present invention. Note that (1) to (5) indicate steps, and the sequence is stored in the ROM 205.

When the third punch hole correction mode processing is started, the number of punch holes input by a user using an operation unit is read in step (1). In step (2), a document size detected by the document size detecting device of the main body or input by the user using the operation unit is read.

It is then checked in step (3) if black images formed by punch holes are present at the right and Left end portions of image data stored in the image memory 203. If N in step (3), the processing ends; otherwise, optimal areas to be changed into white images are determined in accordance with the read number of holes and document size, and hole data stored in the ROM 205, in step (4). After the areas to be changed into white images are determined, the black images in the image memory 203 are changed into white images to correct black image portions due to punch holes to white images in step (5), thus ending the punch hole correction mode processing.

[Fifth Embodiment]

In the fourth embodiment, a user inputs the number of holes to detect the number of punch holes of an image.

Alternatively, assuming that black images formed by punch holes are present at predetermined positions in a document, their hole positions (information of black images (address information with reference to a reference address in the memory)) and the like may be stored in the ROM 205, and when a user who knows that punch holes are present on a document selects a punch hole erasure mode using, e.g., an operation unit, portions corresponding to black image areas may be changed into white images in the memory on the basis of the punch hole information stored in the storage means (ROM) 205 without referring to the punch hole positions of an image stored in the image memory 203, thereby erasing punch hole images.

With this processing, in this embodiment, when a user wants to erase punch hole images of a document, black image information stored in the storage means (ROM) 205 is read out on the basis of the number of punch holes input from the operation unit or the like and the document size detected by the document size detecting device of the main body, and the punch hole images can be erased without any comparison in the memory.

[Sixth Embodiment]

In the first embodiment, on a document having a certain number of punch holes larger than a predetermined number of holes, characters are rarely written in practice between adjacent punch holes due to a small interval between them. However, due to the small interval, a white image area for erasing one punch hole image may overlap another white image area for erasing the neighboring punch hole image.

For this reason, upon reading of a document with a predetermined number of punch holes or more, if it is detected that the number of punch holes is larger than a predetermined value, the CPU 204 may control to change black images in the image memory 203 into white images, so that the entire area including the punch holes is erased.

More specifically, in the arrangement of the first embodiment, if the number of detected punch holes is equal to or larger than a threshold value "20 (holes)", an area where the punch hole is present shown in FIG. 3A is changed into a strip-shaped white image, thereby area-erasing black images formed by punch holes.

In each of the above embodiments, black images are changed into white images having substantially the same diameters as those of punch holes. However, depending on the document set state, the position of the read punch hole image may be shifted from the stored predicted position. For this reason, black images may be controlled to be changed into white images larger by a predetermined dot width than the prestored size of each punch hole. With this processing, a punch hole outline image due to the position shift can be reliably prevented.

According to each of the above embodiments, when an image to be read by a digital equipment for reading an image and converting it into a digital signal includes punch hole images, punch holes on a document are detected by means for inputting, e.g., the number of punch holes by a user using an operation unit or means for detecting, e.g., the number of punch holes by storing the read image in the image memory and processing the image in the memory, thereby correcting black images. For this reason, when punch holes are present on a document, the positions of the punch holes can be detected, and circular black images can be prevented from being formed on an output image due to the punch holes.

In each of the above embodiments, the pressing surface of the document pressing plate is subjected to mirror surface processing. However, the present invention is not limited to this, and any other document pressing plates may be adopted as long as they have a pressing surface with which hole images can be recognized as black images. Also, the present invention may be applied to a case wherein a copying operation is performed while the document pressing plate is open.

The present invention is not limited to the above embodiments, and various modifications may be made within the scope of the appended claims.

What is claimed is:

1. An image forming apparatus comprising:
   reading means for exposing an image on a document, and reading the exposed image;
   storage means for storing image data output from said reading means;
   detection means for detecting a size of the document;
   a memory in which data indicating a position of each punch hole corresponding to a size of the document is prestored;
   discrimination means for discriminating whether or not, the punch hole is present in the document, on the basis of the size of the document detected by said detection means, the data stored in said memory and the image data stored in said storage means;
   converting means for converting a black image of areas in which the punch holes are present to a white image when said discrimination means discriminates that the holes are present; and
   image forming means for forming an image on a recording medium on the basis of the image data stored in said storage means after conversion by said converting means.

2. An apparatus according to claim 1, wherein said memory has prestored data indicating positions of the punch holes corresponding to a type of the number of punch holes.

3. An image forming apparatus comprising:
   reading means for exposing an image on a document having filing holes which transmit light, and reading the exposed image;
   input means for inputting data corresponding to the number of holes present in the document;
   detection means for detecting a position of each hole in the document on the basis of image data output from said reading means and the data input from said input means;
   converting means for converting an image formed by light transmitted by each hole into a white image on the basis of the position of each hole in the document as detected by said detection means; and
   image forming means for forming a document image, which includes the white image converted by said converting means, on a recording medium.

4. An apparatus according to claim 3, wherein said detection means comprises a memory which stores data indicating a normal position of each hole corresponding to the number of holes, and detects the position of each hole in the document on the basis of the data stored in said memory and the data input from said input means.

5. An apparatus according to claim 3, further comprising:
   size detecting means for detecting a size of the document,
   wherein said detection means detects a position of each hole on the document on the basis of the data input by said input means and the size of the document detecting by said size detecting means.

6. An image forming apparatus comprising:
   reading means for exposing an image on a document having filing holes which transmits light, and reading the exposed image;

input means for inputting data corresponding to the number of filing holes present in the document;

generation means for generating size information indicating a size of the document to be read by said reading means;

a memory for storing in advance a plurality of position data indicating a position of each hole corresponding to a plurality of document sizes and the data corresponding to the number of filing holes;

converting means for reading the position data from said memory in accordance with the size information generated by said generation means and the data input by said input means, and converting an image formed by light transmitted by each hole into a white image in accordance with the readout position data without discriminating whether or not the filing hole is present on the document; and image forming means for forming a document image, which includes the white image converted by said converting means, on a recording medium.

7. An apparatus according to claim 6, further comprising: storage means for storing image data output from said reading means, and wherein said converting means converts the image data stored in said storage means, and said image forming means forms an image on the basis of the image data stored in said storage means.

8. An image forming method comprising:

a reading step of exposing an image on a document, and reading the exposed image;

a storage step of storing image data output in said reading step;

a detection step of detecting a size of the document;

a discrimination step of discriminating whether or not punch holes are present in the document, on the basis of data from a memory storing data indicating a position of each punch hole corresponding to the size of the document, the size of the document detected in said detection step and the image data stored in said storage step;

a converting step of converting the black image of areas in which the punch holes are present, which is stored in said storage step, to a white image when said discrimination step discriminates that the holes are present; and an image forming step of forming an image on a recording medium on the basis of the image data stored in said storage step after conversion by said converting step.

9. An image forming method comprising:

a reading step of exposing an image on a document having filing holes which transmit light, and reading the exposed image;

an input step of inputting data corresponding to the number of filing holes present in the document;

a detection step of detecting a position of each hole in the document on the basis of image data output by said reading step and the data input in said input step;

a converting step of converting an image formed by light transmitted by each hole into a white image on the basis of the position of each hole in the document detected by said detection step; and an image forming step of forming a document image, which includes the white image converted by said converting step, on a recording medium.

10. An image forming method comprising:

a reading step for exposing an image on a document having filing holes which transmit light, and reading the exposed image;

an input step of inputting data corresponding to the number of filing holes present on the document;

a generation step of generating size information indicating a size of the document to be read by said reading step;

a converting step of reading position data stored in a memory which stores in advance a plurality of position data indicating a position of each hole corresponding to a plurality of document sizes, in accordance with the size information generated by said generation step and the data corresponding to the number of filing holes input in said input step, and converting an image formed by the light transmitted by each hole into a white image in accordance with the readout position data; and an image forming step of forming a document image, which includes the white image converted by said converting step, on a recording medium.

11. An image forming apparatus comprising:

reading means for exposing a document having punch holes, and reading an image of the document;

first detection means for detecting a number of punch holes present in the document;

second detection means for detecting a position of each punch hole in the document;

converting means for converting an image formed by light transmitted by the hole into a white image on the basis of the position of each hole in the document as detected by said second detection means, wherein said converting means controls whether or not an image existing between neighbor punch holes is converted to the white image, in accordance with the number of punch holes detected by said first detection means; and image forming means for forming on a recording means a document image, which includes the white image converted by said converting means.

12. An apparatus according to claim 11, wherein said detection means comprises a memory which stores data indicating a normal position of each hole corresponding to the number of holes, and detects the position of each hole in the document on the basis of the data stored in said memory and the data input from said input means.

13. An image forming method comprising:

a reading step of exposing a document having punch holes, and reading an image of the document;

a first detection step of detecting a number of punch holes present in the document;

a second detection step of detecting a position of each punch hole in the document;

a converting step of converting an image formed by light transmitted by the hole into a white image on the basis of the position of each hole in the document as detected in said second detection step, wherein said converting step controls whether or not an image existing between neighbor punch holes in converted to the white image, in accordance with the number of punch holes detected in said first detection step; and an image forming step of forming on a recording medium a document image, which includes the white image converted in said converting step.

* * * * *

UNITED STATES PATENT AND TRADEMARK OFFICE
CERTIFICATE OF CORRECTION

PATENT NO. : 5,850,478

DATED : December 15, 1998

INVENTOR(S) : KATSUNARI SUZUKI ET AL.

It is certified that error appears in the above-identified patent and that said Letters Patent is hereby corrected as shown below:

COLUMN 5 line 12, "apparatuses" should read --apparatus--.

COLUMN 6 line 54, "Left" should read --left--.

COLUMN 8 line 66, "transmits" should read --transmit--.

Signed and Sealed this

Twenty-third Day of November, 1999

Attest:

Q. TODD DICKINSON

Attesting Officer     Acting Commissioner of Patents and Trademarks